(12) United States Patent
Lee et al.

(10) Patent No.: US 8,284,313 B2
(45) Date of Patent: Oct. 9, 2012

(54) APPARATUS AND METHOD FOR DETERMINING NOISE

(75) Inventors: Mi-yeon Lee, Suwon-si (KR); Seung-hoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 480 days.

(21) Appl. No.: 12/552,706

(22) Filed: Sep. 2, 2009

(65) Prior Publication Data

US 2010/0110293 A1    May 6, 2010

(30) Foreign Application Priority Data

Nov. 4, 2008 (KR) .......................... 10-2008-0109007

(51) Int. Cl.
*H04N 5/00*   (2011.01)

(52) U.S. Cl. ........................................ 348/618; 348/622

(58) Field of Classification Search .......... 348/618–624, 348/553–558

See application file for complete search history.

(56) References Cited

U.S. PATENT DOCUMENTS

| 7,408,989 B2 * | 8/2008 | Rault et al. ............... 375/240.16 |
| 7,420,618 B2 * | 9/2008 | Swartz ..................... 348/554 |
| 2005/0259878 A1 * | 11/2005 | Drezner et al. ............. 382/236 |

* cited by examiner

*Primary Examiner* — Michael Lee

(74) *Attorney, Agent, or Firm* — Sughrue Mion, PLLC

(57) ABSTRACT

A noise determining apparatus is provided. The noise determining apparatus includes a video determiner which determines type of video according to a pre-set criterion, a noise level determiner which determines a level of noise with reference to output from the video determiner, and a noise determiner which determines presence or absence of noise with reference to output from the noise level determiner. Accordingly, incorrect discrimination between a texture area of low level which is similar to noise and noise having a great level difference with respect to neighboring pixels is reduced.

20 Claims, 6 Drawing Sheets

APPARATUS AND METHOD FOR DETERMINING NOISE

CROSS-REFERENCE TO RELATED APPLICATIONS

This application claims priority from Korean Patent Application No. 10-2008-0109007, filed on Nov. 4, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to determining noise, and more particularly, to determining noise which is capable of reducing incorrect discrimination between a texture area of low level which is similar to noise and noise having a great level difference with respect to neighboring pixels.

2. Description of the Related Art

The digital broadcasting service, which has been tried due to the advance of video and audio compression technology, has become widespread beyond the experimental stage. Although the digital broadcast enables a user to watch high definition (HD) video signals which provide a clearer image than standard definition (SD) videos signals, there is still a continuous demand for a more vivid and clearer image.

However, the digital broadcast cannot be free from noise. That is, the digital broadcast is affected by various sources such as noise existing in the manufacturing phase, noise generated during transmission, noise generated during decoding operation, and noise generated from an additional process for improving image quality.

A related art method to remove noise from an image is to reduces only noise signals through filtering without causing damage to an edge or a texture area. In general, the edge or the texture area is determined depending on pixel values. To this end, a texture area of low level which is similar to noise is incorrectly determined to be noise, or noise having a great level difference is incorrectly determined to be a texture area. Therefore, there is a demand for solving this problem.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Exemplary embodiments of the present invention provide an apparatus and a method for determining noise more effectively.

According to an aspect of the present invention, a noise determining apparatus comprises a video determiner which determines a type of video according to a pre-set criterion, a noise level determiner which determines a level of noise with reference to an output from the video determiner, and a noise determiner which determines presence or absence of noise with reference to an output from the noise level determiner.

The video determiner may comprise a video analyzer which analyzes at least one of resolution, aspect ratio, frame rate, bit rate, and video buffer size with respect to the video.

The video determiner may comprise a video detector which detects whether resolution of the video has been converted or not.

The noise level determiner may determine the level of noise in the unit of pixels.

The noise determiner may comprise a correlation calculator which calculates correlation in the unit of windows.

The noise determiner may further comprise a noise presence/absence determiner which determines presence or absence of noise with reference to an output from the correlation calculator.

The correlation calculator may use a pixel window and a search window.

The correlation calculator may calculate correlation between a pixel window and neighboring pixels in a search window.

The noise presence/absence determiner may determine presence of noise if an output value of the correlation calculator is less than a pre-set value.

According to another aspect of the present invention, a noise determining method comprises determining a type of video according to a pre-set criterion, determining a level of noise with reference to the type of video, and determining presence or absence of noise with reference to the level of noise.

The operation of determining the type of video may comprise analyzing at least one of resolution, aspect ratio, frame rate, bit rate, and video buffer size with respect to the video.

The operation of determining the type of video may comprise detecting whether resolution of the video has been converted or not.

The operation of determining the level of noise may determine the level of noise in the unit of pixels.

The operation of determining the presence or absence of noise may comprise calculating correlation in the unit of windows.

The operation of determining the level of noise may further comprise determining presence or absence of noise with reference to an output form the operation of calculating the correlation.

The operation of calculating the correlation may use a pixel window and a search window.

The operation of calculating the correlation may calculate correlation between a pixel window and neighboring pixels in a search window.

The operation of determining the presence or absence of noise may determine the presence of noise if a value output in the operation of calculating the correlation is less than a pre-set value.

Additional and/or other aspects and advantages of the invention will be set forth in part in the description which follows and, in part, will be obvious from the description, or may be learned by practice of the invention.

BRIEF DESCRIPTION OF THE DRAWING FIGURES

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
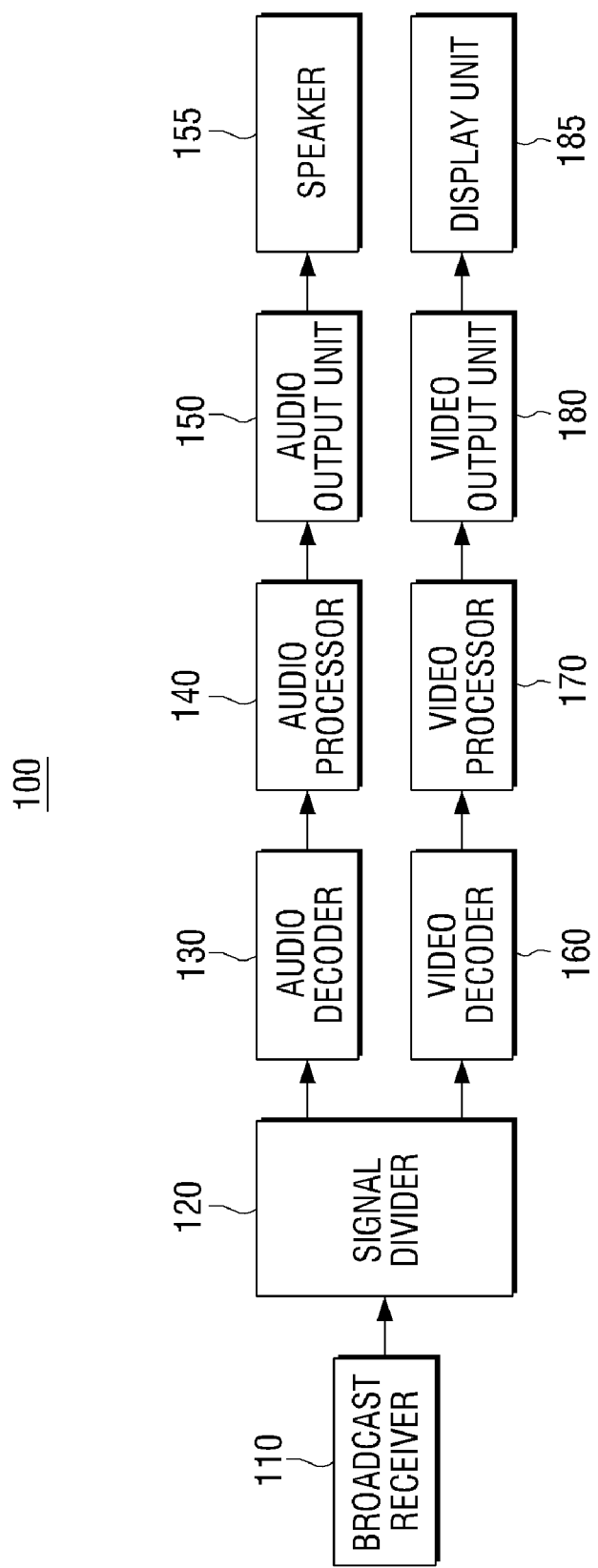
FIG. 1 is a block diagram illustrating a digital television (DTV) consistent with an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in excessive detail since they would obscure the invention unnecessarily.

FIG. 1 is a block diagram illustrating an apparatus according to an exemplary embodiment of the present invention. For example, the apparatus of FIG. 1 may be a digital television (DTV) 100. However, the present invention is not necessarily applied to only the DTV 100 and can be applied to various display apparatuses displaying images, such as an electronic album, a monitor, and a laptop computer.

As shown in FIG. 1, the DTV 100 comprises a broadcast receiver 110, a signal divider 120, an audio decoder 130, an audio processor 140, an audio output unit 150, a speaker 155, a video decoder 160, a video processor 170, a video output unit 180, and a display unit 185.

The broadcast receiver 110 tunes to broadcast signals transmitted from a broadcasting station in a wired or wireless manner and demodulates the tuned broadcast signals.

The signal divider 120 divides the demodulated broadcast signals output from the broadcast receiver 110 and then recombines the divided signals. This is because the digital broadcast has video, audio, and data multiplexed in the unit of a transport packet, and the signal divider 120 divides and recombines such multiplexed transport packets.

Such dividing and recombining operations are very complex in a situation of data broadcast and thus are limited to audio and video signals in described exemplary embodiments for the sake of simplicity.

The signal divider 120 divides the demodulated broadcast signals into audio signals and video signals, and transmits the audio signals to the audio decoder 130 and the video signals to the video decoder 160.

The audio decoder 130 decodes the audio signals output from the signal divider 120. The audio processor 140 additionally processes the decoded audio signals, for example, by removing audio noise or adding a special audio effect. The signals output from the audio processor 140 are converted into final signal formats suitable for the speaker 155 by the audio output unit 150 and are finally output through the speaker 155.

The video decoder 160 decodes the video signals output from the signal divider 120. Accordingly, the video decoder 160 outputs decompressed video signals.

The video processor 170 additionally processes the video signals output from the video decoder 160. For example, the additional processing may include various processes of improving image quality and a process of displaying an image, for example, adding a graphic signal represented by a menu generated in a graphic user interface generator (not shown), converting output resolution, and changing an output video area.

The video output unit 180 finally converts the video signals output from the video processor 170 into video signals having a format that can be output through the display unit 185. The display unit 185 is realized as a display panel of various types such as a liquid crystal display (LCD) and plasma display panel (PDP), and displays the video signals of the format converted by the video output unit 180.

Figure 2:
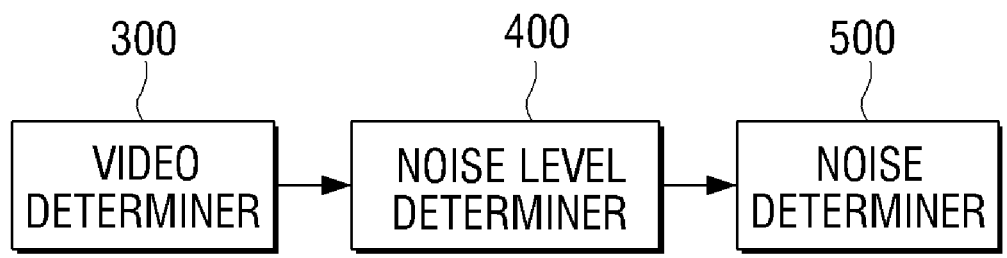
FIG. 2 is a block diagram illustrating a noise determining apparatus consistent with an exemplary embodiment of the present invention.

FIG. 2 is a block diagram illustrating a noise determining apparatus according to an exemplary embodiment of the present invention. The noise determining apparatus may be mounted in various products and hereinafter will be described on the assumption that it is mounted in a DTV The noise determining apparatus may be mounted in the video processor 170 of the DTV of FIG. 1. Besides the noise determining apparatus, various apparatuses may be mounted in the video processing apparatus 170.

As shown in FIG. 2, a noise determining apparatus 200 according to an exemplary embodiment of the present invention comprises a video determiner 300, a noise level determiner 400, and a noise determiner 500. The video determiner 300 determines the type of input video according to a pre-set or desired criterion. This will be described in detail with reference to FIG. 3.

The noise level determiner 400 determines the level of noise with reference to the output from the video determiner 300. When determining the level of noise according to the input video, the noise level determiner 400 may refer to another value besides the output from the video determiner 300 as will be described in detail with reference to FIG. 3.

The noise determiner 500 determines presence or absence of noise with reference to the output from the noise level determiner 400. Besides the output from the noise level determiner 400, another value may be referred to in determining the presence or absence of noise as will be described in detail with reference to FIG. 3.

Figure 3:
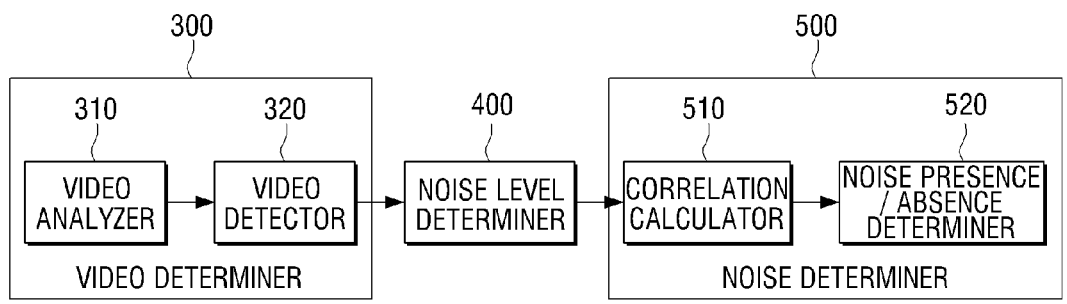
FIG. 3 is another block diagram illustrating a noise determining apparatus consistent with an exemplary embodiment of the present invention.

FIG. 3 is another block diagram illustrating a noise determining apparatus according to an exemplary embodiment of the present invention. The exemplary embodiment of FIG. 3 does not conflict with the exemplary embodiment of FIG. 2 and descriptions of similar parts may apply to both FIG. 2 and FIG. 3.

As shown in FIG. 3, a noise determining apparatus comprises a video determiner 300 which comprises a video analyzer 310 and a video detector 320. Also, the noise determining apparatus comprises a noise level determiner 400 and a noise determiner 500 comprising a correlation calculator 510 and a noise presence/absence determiner 520.

The video analyzer 310 analyzes factors indicating characteristics of the input video, such as resolution, aspect ratio, frame rate, bit rate, and video buffer size. Several methods may be used for analyzing the input video. For example, information regarding resolution, aspect ratio, frame rate, bit rate, and video buffer size can be obtained with reference to a sequence header of a video stream. Based on the information, the characteristic and type of the input image can be determined.

The video detector 320 detects whether the resolution of the input video has been converted or not. There are two types of HD level video signals transmitted from the broadcasting station, that is, an original HD level video signal and an HD level video signal converted from an SD level video signal. The HD level video converted from the SD level video has a different characteristic from that of the original HD level signal and accordingly has a different noise characteristic. Several methods may be used for discriminating the two HD level videos. For example, received video signals may be transformed into a frequency area and then a frequency characteristic of the video signals transformed into the frequency area may be analyzed.

The video determiner 300, comprising the video analyzer 310 and the video detector 320, may consider all the results of the analysis in determining the type of video.

The type of video may be classified by an input source such as a digital video disc (DVD) input, blu-ray disc (BD) input, DTV input, scaled DTV input, or may be classified by an internal criterion.

The noise level determiner 400 determines the level of noise with reference to the output from the video determiner 300. Various methods may be used for determining the level of noise. For example, the level of noise may be determined in the unit of pixels with reference to the output from the video determiner 300. That is, the level of noise may be expressed by the number of pixels which are determined to be noise. In the case of a scaled DTV input, resolution changes and thus the level of noise becomes higher before scaling. Also, noise of a low level has a small value of 1×1, but grain noise may have a relatively larger value of 3×3 or 3×4. Discrete cosine transform (DCT) pattern noise may have a much larger value of 8×8.

The correlation calculator 510 calculates correlation using a window. The correlation calculator 510 calculates correlation between a specific area and neighboring pixels to determine whether the specific area is noise or not. Using a window to calculate the correlation will be described with reference to FIG. 6.

Figure 6:
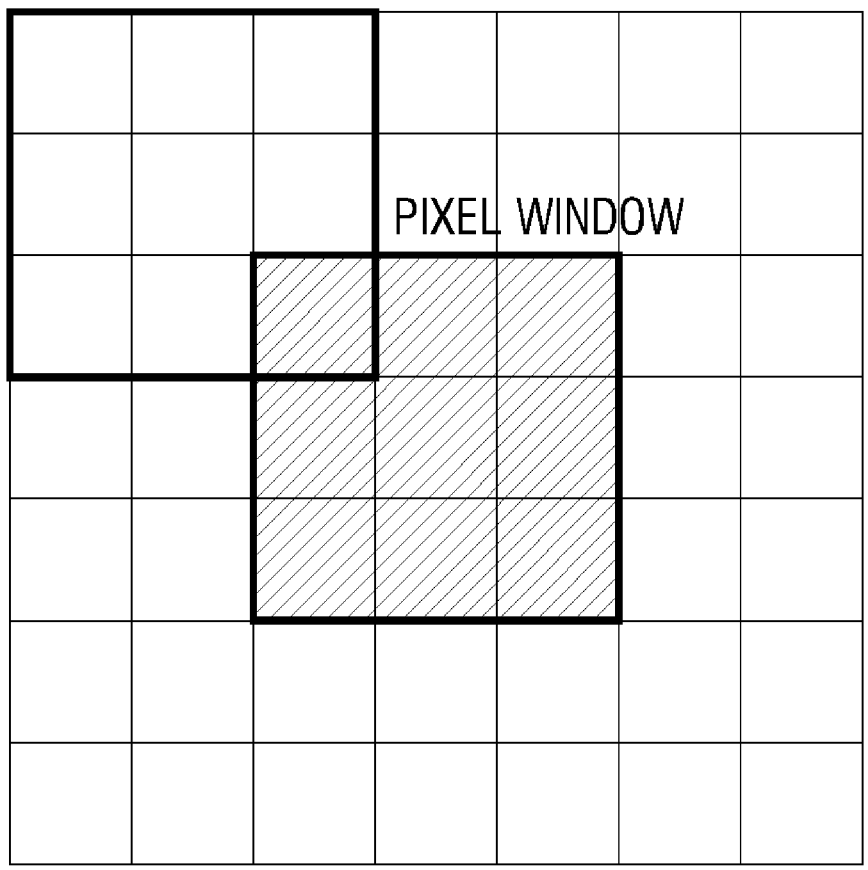
FIG. 6 is a view provided to explain a correlation calculator of the noise determining apparatus consistent with an exemplary embodiment of the present invention.

FIG. 6 illustrates two windows, that is, a pixel window and a search window. The pixel window indicates the level of noise if the level of noise is determined in units of pixels by the noise level determiner 400. The search window indicates a search area and, if a pixel window presumed to be noise is set, the search window limits the values of circumferential pixels of the pixel window.

The correlation calculator 510 calculates a difference value between the pixel window presumed to be noise and the circumferential window using the pixel window in the search window to determine the correlation. The correlation calculator 510 moves the pixel window in the search window in sequence and determines correlation for each pixel window. The method for calculating the difference value may include, but is not limited to, sum of absolute difference (SAD), mean absolute difference (MAD), and mean square difference (MSD).

The noise presence/absence determiner 520 determines presence or absence of noise with reference to the output from the correlation calculator 510. That is, if a value indicating the correlation is greater than a threshold, absence of noise is determined because of the high correlation with the neighboring pixels. On the other hand, if the value indicating the correlation is less than the threshold, the presence of noise is determined because of the low correlation with the neighboring pixels.

The noise determiner 500 may comprise the correlation calculator 510 and the noise presence/absence determiner 520, and makes a final decision as to the presence/absence of noise considering all the output values from the correlation calculator 510 and the noise presence/absence determiner 520.

Figure 4:
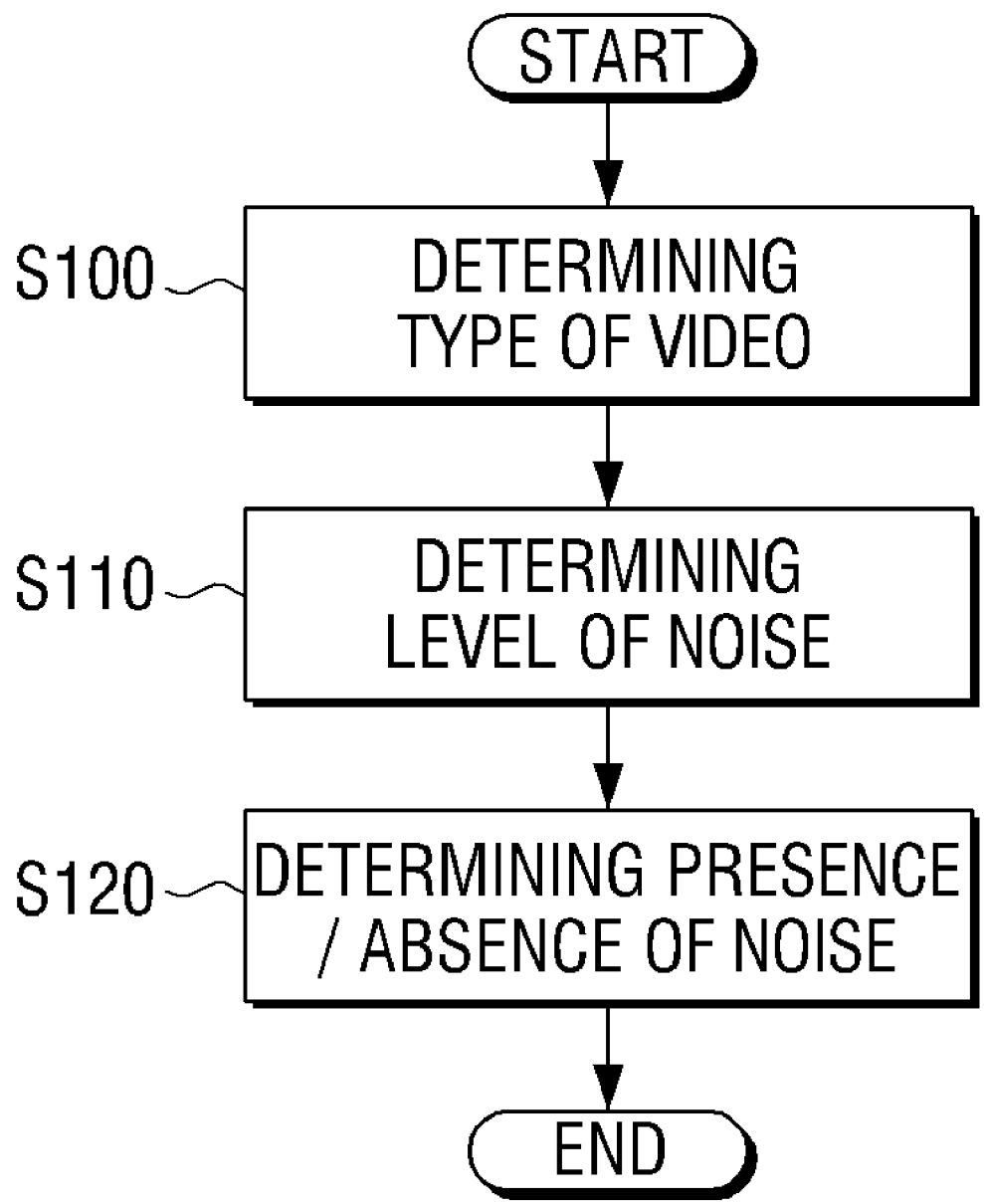
FIG. 4 is a flowchart illustrating a noise determining method consistent with an exemplary embodiment of the present invention.

FIG. 4 is a flowchart illustrating a noise determining method according to an exemplary embodiment of the present invention. The type of input video is first determined (S100). The type of video is determined according to a pre-set criterion, which will be described in detail with reference to FIG. 5. Operation S100 includes operations S200, S210, and S220 of FIG. 5.

The level of noise is determined with reference to the output of operation S100 (S110). The level of noise may be determined according to the type of input video with reference to another value besides the output of S100. This operation will be described in detail with reference to FIG. 5. Operation S110 comprises operation S230 of FIG. 5.

The presence or absence of noise is determined with reference to the output of operation S110 (S120). The presence or absence of noise may be determined with reference to another value besides the output from the noise level determiner 400. Operation S120 comprises operations S240 and S250 as will be described with reference to FIG. 5.

Figure 5:
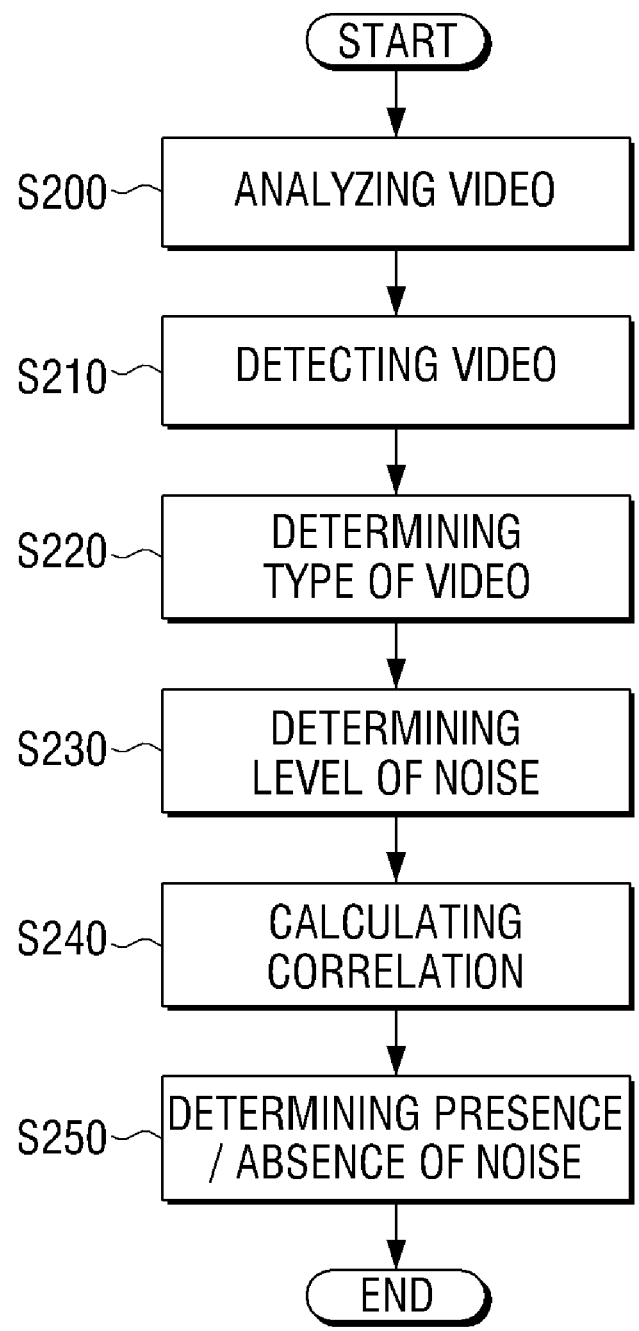
FIG. 5 is another flowchart illustrating a noise determining method consistent with an exemplary embodiment of the present invention.

FIG. 5 is a flowchart illustrating the noise determining method of FIG. 4 in further detail.

Factors indicating characteristics of input video, such as resolution, aspect ratio, frame rate, bit rate, and video buffer size, are analyzed (S200). Several methods may be used for analyzing the input video. For example, information regarding resolution, aspect ratio, frame rate, bit rate, and video buffer size can be obtained with reference to a sequence header of a video stream. Based on the information, the characteristic and type of the input image is determined.

It is then determined whether the resolution of the input video has been converted or not (S210). The HD level video signal transmitted from the broadcasting station is divided into an original HD video signal and an HD video signal which has been converted from an SD level video signal. The HD level video converted from the SD level video has a different video characteristic from the original HD level video and accordingly has a different noise characteristic. There are various methods for discriminating the two HD level video signals. For example, received video signals may be transformed into a frequency area and then a frequency characteristic of the video signal transformed into the frequency area may be analyzed.

The type of video is determined considering the analysis results of operations S210 and S220. The type of video is classified by an input source, such as a DVD input, BD input, DTV input, and scaled DTV input, or may be classified by an internal criterion.

The level of noise is determined with reference to the output from operation S220 (S230). There are various methods for determining the level of noise. For example, the level of noise may be determined in the unit of pixels with reference to the output from operation S220. Since resolution changes in the case of a scaled DTV input, the level of noise becomes higher before scaling. Also, noise of a low level has a small value of 1×1 but grain noise has a relatively greater value of 3×3 or 3×4. The DCT pattern noise has a much greater value of 8×8.

Correlation is calculated using the noise level determined in operation S230 and a window (S240). Correlation between a specific area of an image and neighboring pixels is calculated to determine presence or absence of noise in the specific area. In order to calculate correlation, a window is used, which will be described with reference to FIG. 6.

FIG. 6 illustrates two windows, that is, a pixel window and a search window. The pixel window indicates the level of noise if the level of noise is determined in the unit of pixels by the noise level determiner 400. The search window indicates a search area and if a pixel window presumed to be noise is set, the search window limits the values of the circumferential pixels of the pixel window. The correlation calculator 510 calculates a difference value between the pixel window presumed to be noise and the circumferential pixel window using the pixel window in the search window to determine correlation. The method for calculating the difference value may include, but is not limited to, SAD, MAD, and MSD.

The presence or absence of noise is determined with reference to the output from operation S240 (S250). If a value indicating correlation is greater than a threshold, absence of noise is determined because of the high correlation with the neighboring pixels. On the other hand, if the value is less than the threshold, the presence of noise is determined because of the low correlation with the neighboring pixels.

Up to now, the apparatuses and the methods for determining noise according to exemplary embodiments of the present invention have been described with reference to FIGS. 1 to 6.

In the above-described exemplary embodiments, the DTV is mainly described, but the present invention can be applied to other display apparatuses such as a set-top box and a mobile phone or an electronic apparatus.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A noise determining apparatus comprising:
   a video type determiner which determines a type of a video according to a determination criterion;
   a noise size setting unit which determines a size of noise with reference to an output from the video type determiner; and
   a noise determiner which determines if a pixel window of an image of the video is a noise or not with reference to an output from the noise size setting unit.

2. The noise determining apparatus as claimed in claim 1, wherein the video type determiner comprises a video analyzer which analyzes at least one of resolution, aspect ratio, frame rate, bit rate, and video buffer size with respect to the video.

3. The noise determining apparatus as claimed in claim 1, wherein the video type determiner comprises a video detector which detects whether a resolution of the video has been converted or not.

4. The noise determining apparatus as claimed in claim 1, wherein the noise size setting unit determines the size of the noise in a unit of pixels.

5. The noise determining apparatus as claimed in claim 1, wherein the noise determiner comprises a correlation calculator which calculates correlation in a unit of windows.

6. The noise determining apparatus as claimed in claim 5, wherein the noise determiner further comprises a noise presence/absence determiner which determines presence or absence of noise with reference to an output from the correlation calculator.

7. The noise determining apparatus as claimed in claim 5, wherein the correlation calculator calculates the correlation using a pixel window and a search window.

8. The noise determining apparatus as claimed in claim 5, wherein the correlation calculator calculates correlation between a pixel window and neighboring pixels in a search window.

9. The noise determining apparatus as claimed in claim 6, wherein the noise presence/absence determiner determines presence of noise if an output value of the correlation calculator is less than a comparison value.

10. A noise determining method comprising:
    determining a type of a video according to a determination criterion;
    determining a size of noise with reference to the determined type of the video; and
    determining if a pixel window of an image of the video is a noise or not with reference to the determined size of the noise.

11. The noise determining method as claimed in claim 10, wherein the determining the type of the video comprises analyzing at least one of resolution, aspect ratio, frame rate, bit rate, and video buffer size with respect to the video.

12. The noise determining method as claimed in claim 10, wherein the determining the type of the video comprises detecting whether a resolution of the video has been converted or not.

13. The noise determining method as claimed in claim 10, wherein the determining the size of noise determines the size of the noise in a unit of pixels.

14. The noise determining method as claimed in claim 10, wherein the determining if the pixel window of the image of the video is a noise or not comprises calculating correlation in a unit of windows.

15. The noise determining method as claimed in claim 14, wherein the determining the size of noise further comprises determining presence or absence of the noise with reference to the calculated correlation.

16. The noise determining method as claimed in claim 14, wherein the calculating the correlation comprises calculating the correlation using a pixel window and a search window.

17. The noise determining method as claimed in claim 14, wherein the calculating the correlation comprises calculating correlation between a pixel window and neighboring pixels in a search window.

18. The noise determining method as claimed in claim 15, wherein the determining the presence or absence of noise comprises determining the presence of noise if the calculated correlation is less than a comparison value.

19. A method for determining noise in a video signal, the method comprising:
    analyzing the video signal to detect characteristics of the video signal;
    determining a type of the video signal based on the detected characteristics;
    determining a size of noise of the video signal based on the determined type of the video signal;
    calculating a correlation between a specific area of a frame of the video signal and neighboring pixels; and
    determining if a pixel window of an image of the video is a noise or not with reference to the calculated correlation.

20. The method as claimed in claim 19, wherein an absence of noise is determined if the calculated correlation is greater than a threshold value, and a presence of noise is determined if the calculated correlation is less than the threshold value.

* * * * *